US008153028B2

(12) United States Patent
Leimenstoll et al.

(10) Patent No.: US 8,153,028 B2
(45) Date of Patent: Apr. 10, 2012

(54) ANTICORROSION ADDITIVES FOR MANUFACTURING PROCESSES, A PROCESS FOR PREPARATION THEREOF AND USE THEREOF

(75) Inventors: Sandra Leimenstoll, Mannheim (DE); Anke Blaul, Darmstadt (DE); Reinhard Stier, Lambertheim (DE); Isabell Lange, Hockenheim (DE); David Larem, Eppertshausen (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 0 days.

(21) Appl. No.: 12/891,854

(22) Filed: Sep. 28, 2010

(65) Prior Publication Data
US 2011/0088589 A1    Apr. 21, 2011

(30) Foreign Application Priority Data
Oct. 1, 2009   (EP) .................................... 09171995

(51) Int. Cl.
*C09K 3/00* (2006.01)
*C23F 11/00* (2006.01)
*C04B 9/02* (2006.01)

(52) U.S. Cl. ..... 252/394; 252/387; 252/396; 106/14.05; 106/14.41; 106/14.42

(58) Field of Classification Search ................. 252/387, 252/394, 396; 106/14.05, 14.41, 14.42
See application file for complete search history.

(56) References Cited

U.S. PATENT DOCUMENTS

| | | | |
|---|---|---|---|
| 3,045,042 A | 7/1962 | Staker | |
| 3,117,091 A | 1/1964 | Staker | |
| 3,948,916 A | 4/1976 | Porret et al. | |
| 4,148,605 A | 4/1979 | Andress, Jr. | |
| 4,448,586 A * | 5/1984 | Weidig | 44/398 |
| 4,595,523 A * | 6/1986 | Knepper et al. | 252/390 |
| 4,612,236 A * | 9/1986 | Hsu et al. | 428/216 |
| 4,647,392 A | 3/1987 | Darden et al. | |
| 4,745,141 A * | 5/1988 | Akiyama et al. | 523/500 |
| 4,902,443 A | 2/1990 | Penninger et al. | |
| 5,080,817 A | 1/1992 | Meyer | |
| 5,169,458 A | 12/1992 | Shulman et al. | |
| 5,750,750 A | 5/1998 | Duncan et al. | |
| 6,080,331 A | 6/2000 | Meszaros et al. | |
| 6,143,243 A | 11/2000 | Gershun et al. | |
| 6,391,257 B1 | 5/2002 | Woyciesjes | |
| 6,398,984 B1 | 6/2002 | Maes et al. | |
| 6,420,040 B1 * | 7/2002 | Seibel et al. | 428/458 |
| 6,676,848 B2 | 1/2004 | Maes et al. | |
| 7,462,295 B2 | 12/2008 | Nishii et al. | |
| 7,476,445 B2 * | 1/2009 | Saito et al. | 428/425.8 |
| 2009/0209441 A1 | 8/2009 | Lange et al. | |
| 2010/0028878 A1 | 2/2010 | Labrie et al. | |

FOREIGN PATENT DOCUMENTS

| | | |
|---|---|---|
| DE | 3824447 A1 | 1/1990 |
| DE | 19956237 A1 | 5/2001 |
| EP | 0739966 A1 | 10/1996 |
| WO | 2008089858 A1 | 7/2008 |

OTHER PUBLICATIONS

European Search Report from co-pending Application EP09171995 dated Mar. 1, 2010, 3 pages.
S. Watanabe et al; Journal of Oleo Science, 57, (1) pp. 1-10, (2008) "Preparations and Properties of Anti-corrosion Additives of Water-soluble Metal Working Fluids for Aluminum Alloy Materials".
Yamamoto et al: Journal of Oleo Science, 56, (9) pp. 463-469, (2007) "Water-Soluble Metal Working Fluids Additives Derived from the Esters of Acid Anhydrides with Higher Alcohols for Aluminum Alloy Materials".
Kohara, Ichitaro; Tomoda, Hideyuki and Watanabe, Shoji; "New Water-soluble Metal Working Fluids Additives from Phosphonic Acid Derivatives for Aluminum Alloy Materials", Journal of Oleo Science, 56 (10) 527-532 (2007).
Brutto, Patrick; Hills, Michael; Pyzowski, Bonnie; "Aluminum Staining Control in Metalworking Fluids", ANGUS Chemical Company, A Subsidiary of the Dow Chemical Company.

* cited by examiner

*Primary Examiner* — Lorna M Douyon
*Assistant Examiner* — Tanisha Diggs
(74) *Attorney, Agent, or Firm* — Nicanor A. Kohncke

(57) ABSTRACT

The present invention relates to novel anticorrosion additives for manufacturing processes, comprising at least one triazole and the reaction product of at least one alkylene glycol and at least one carboxylic anhydride, to a process for preparation thereof and to the use thereof for corrosion protection for aluminum and/or aluminum alloys.

8 Claims, No Drawings

ANTICORROSION ADDITIVES FOR MANUFACTURING PROCESSES, A PROCESS FOR PREPARATION THEREOF AND USE THEREOF

The present invention relates to novel anticorrosion additives for manufacturing processes, comprising at least one triazole and the reaction product of at least one alkylene glycol and at least one carboxylic anhydride, to a process for preparation thereof and to the use thereof for corrosion protection for aluminium and/or aluminium alloys.

A wide variety of different anticorrosion additives for aluminium (corrosion inhibitors) are available on the market. These are primarily silicon-containing anticorrosion additives, for example tetraethyl silicate and sodium metasilicate. However, specifically in the case of the silicate-containing compounds, problems arise in the subsequent surface treatments.

The phosphorus-containing anticorrosion additives used nowadays are, for example, polyoxyethylene oleyl ether phosphates and/or 1-hydroxyethane-1,1-diphosphonic acid. Since phosphorus is subject to severe price fluctuations, it is desirable to replace it with equally effective but less expensive alternatives.

Suitable anticorrosion additives for aluminium are likewise long-chain (di-) carboxylic acids. For example, EP-A 0439911 discloses the corrosion-inhibiting action of carboxylic acids in liquid alcohols. These mixtures may also comprise, for example, triazoles as further components, see EP-A 1598407 and WO 00/11102, or else silanes, see EP 0739966 A1.

However, a disadvantage of these mixtures is that they have poor emulsifiability.

In EP 816467 B1, mixtures of the alkalimetal, ammonium and amine salts of hydroxyl-containing aromatic monocarboxylic acids and of linear and branched aliphatic monocarboxylic acids having 5 to 12 carbon atoms are used as corrosion inhibitors in antifreeze concentrates. The aliphatic monocarboxylic acids may also contain ether oxygen atoms or carbonyl functions as further functional groups. However, the action thereof is significantly worse than that of the aforementioned alternatives, also in relation to emulsifiability.

Watanabe et al. in J. Oleo Sci, 56 (9), pp. 463-469 (2007) and in J. Oleo Sci, 57 (1), pp. 1-10 (2008) reports, inter alia, a maleic anhydride-derivatized poly-THF with good anticorrosion properties and hard water stability, but these mixtures have low efficiency too.

It was therefore an object of the present invention to provide phosphorus- and silicon-free anticorrosion additives for manufacturing processes, which are simple and inexpensive to prepare and are at least just as effective as the phosphorus- and silicon-containing agents to be replaced. Moreover, the anticorrosion additive should be storage-stable, have good emulsifiability and be soluble in water.

This object is achieved by the inventive anticorrosion additives which comprise at least one triazole and the reaction product of at least one alkylene glycol and at least one carboxylic anhydride.

The present invention provides anticorrosion additives for manufacturing processes, comprising at least one triazole, preferably tolyl- and/or benzotriazole, and the reaction product of at least one alkylene glycol and at least one carboxylic anhydride.

Alkylene glycols in the context of the invention are preferably alkylene glycols having 3 to 24 carbon atoms in the molecule ($C_3$-$C_{24}$-alkylene glycol). Particular preference is given to triethylene glycol, diethylene glycol, dipropylene glycol and tripropylene glycol.

These are commercial products.

Carboxylic anhydrides in the context of the invention are preferably cyclic, saturated, unsaturated and/or aromatic, optionally substituted $C_4$-$C_{20}$-carboxylic anhydrides.

Particularly preferred carboxylic anhydrides are maleic anhydride, phthalic anhydride, succinic anhydride and/or glutaric anhydride.

Substituents in the context of the invention are, for example, $C_1$-$C_{16}$-alkyl groups or substituted or unsubstituted $C_6$-$C_{18}$ aryl groups.

In a particularly preferred embodiment of the invention, the anticorrosion additives comprise the reaction product of triethylene glycol and maleic anhydride.

These are commercial products.

The ratio of alkylene glycol to carboxylic anhydride is preferably 0.7:2 to 1.3:2.

The ratio of triazole to the reaction product of alkylene glycol and carboxylic anhydride is preferably 1:10 to 1:2.

The reaction product in the context of the invention is the reaction product of at least one alkylene glycol and at least one carboxylic anhydride, which can be prepared by the processes familiar to those skilled in the art. For example, one possible preparation is that according to U.S. Pat. No. 2,698,856. This describes the preparation of the dimaleic acid-triethylene glycol derivative via a one-pot synthesis on the laboratory scale at 125° C. The temperature rises to 160° C. during the reaction, which illustrates the high exothermicity of the reaction. This process is therefore unsuitable for industrial scale operation.

In DE 3824447 A1 and EP A 0249148, a 1,2-alkanediol is likewise reacted with a carboxylic anhydride via a one-pot synthesis. For this purpose, the reactants are dissolved in toluene and then boiled under reflux. The ratio of reactants to toluene is approx. 1 to 1.

Much more preferred where the industrial scale synthesis is concerned is the reaction of alkylene glycol and at least one carboxylic anhydride at temperatures of at least 60° C., but at most 100° C., without use of a solvent. At temperatures above 100° C., too much heat of reaction arises, which greatly complicates, or even makes impossible, reaction control in the industrial scale synthesis. In the case of use of a solvent, this has to be removed at the end of the reaction and the product has to be dried, which gives rise to considerable disadvantages in economic viability. In a preferred embodiment of the invention, the carboxylic anhydride is initially charged and melted, and then alkylene glycol is added in and the reaction product is held at 80° C. for a while to complete the reaction. However, the reverse sequence of addition is likewise possible, as well as is simultaneous dosed additions.

The term "manufacturing process" in the context of the invention encompasses all processes according to DIN 8580, for example forming, cutting, joining and coating. Additionally encompassed, as well as the processes of industrial manufacture, are also other fields of application, for example in maintenance or in the household. Additionally included is use in lubricants with a water content according to ISO 6743.

Metals in the context of the invention are preferably aluminium and/or aluminium alloys. The inventive anticorrosion additives for manufacturing processes are, however, also usable for light metals, such as magnesium and titanium, and the corresponding alloys.

The invention additionally provides a process for preparing the inventive anticorrosion additives, according to which the reaction product of alkylene glycol and at least one carboxylic anhydride is first prepared either by a) melting the carboxylic anhydride and then adding alkylene glycol at temperatures of at least 60° C. and of max. 100° C., or b) reacting carboxylic anhydride and alkylene glycol at temperatures of at least 60° C. and of max. 100° C., and then adding triazole and optionally further additives to the reaction product.

The inventive anticorrosion additives may also comprise further components, for example other phosphorus- and silicon-free anticorrosives, for example sulphonic esters, for example Additin® RC 4810. The components used may additionally be:

Group I to V oils as defined by the American Petroleum Institute (API), fatty acids, for example tall oil fatty acid, fatty acid esters, alkylbenzenesulphonic acids, alkanolamines such as ethanolamine, alkylamines, for example triethylamine, fatty acid amides, triglycerides, sulphurised fatty acid esters and/or sulphurised olefins, dimercaptothiadiazole derivatives, carbamates, polyglycol ethers, alcohol ethoxylates, ethercarboxylic acids, glycols/glycol ethers, for example butyldiglycol, biocides, defoamers, emulsifiers, surfactants, fatty alcohols.

The invention further additionally provides a process for protecting aluminium and/or aluminium alloys from corrosion, according to which the aforementioned inventive anticorrosion additives comprising at least one triazole and the reaction product of at least one $C_3$-$C_{24}$-alkylene glycol and at least one carboxylic anhydride are applied to the aluminium and/or aluminium alloys. In relation to the inventive anticorrosion additives, reference is made to the above remarks in this application.

The application can be effected by all common application methods, for example dipping, spraying, etc.

The present invention therefore further provides for the use of the inventive anticorrosion additives for protection for aluminium and/or aluminium alloys. These alloys include pure aluminium, cast and forging alloys, and aluminium bronzes, as described, for example, in DIN EN 576, DIN 1706, DIN EN 573 and DIN 1982.

The invention is illustrated in detail by the examples which follow, though they do not have any limiting effect.

EXAMPLES

Unless stated otherwise, all parts and percentages are based on weight.

A) Preparation of the Reaction Product of Maleic Anhydride with Triethylene Glycol (MATEG Derivative)

A 4-neck flask was initially charged with 98.1 g (1.0 mol) of maleic anhydride which was melted (m.p.=56° C.). 75.24 g (0.501 mol) of triethylene glycol were added dropwise to the molten maleic anhydride. In order to achieve a virtually complete conversion, a temperature of 60° C. was first established for 3 h, and then a temperature of 80° C. for 3 h.

B) Production of a Formulation Comprising a)

0.5% by weight of the reaction product prepared above (MATEG derivative) was formulated into the following mixture in the sequence listed in the following table. The amounts are in % by weight.

| Constituents | A (inventive) | B (comparative) | C (comparative) | D (comparative) |
|---|---|---|---|---|
| Nynas ® T 22 | 42.4 | 42.9 | 42.4 | 42.4 |
| Synative ™ ES EHO | 10 | 10 | 10 | 10 |
| (Edenor EHO) | | | | |
| Additin ® RC 4810 | 7 | 7 | 7 | 7 |
| MEA | 2 | 2 | 2 | 2 |
| TEA | 8 | 8 | 8 | 8 |
| Rewocoros AC 101 | 6 | 6 | 6 | 6 |
| TOFA | 5 | 5 | 5 | 5 |
| Additin ® RC 5800 | 0.1 | 0.1 | 0.1 | 0.1 |
| Additin ® RC 2415 | 6 | 6 | 6 | 6 |
| Additin ® RC 2317 | 3 | 3 | 3 | 3 |
| MATEG derivative | 0.5 | 0 | 0 | 0 |
| TEOS | 0 | 0 | 0.5 | 0 |
| Cublen K 60 | 0 | 0 | 0 | 0.5 |
| Emulsogen M | 2.9 | 2.9 | 2.9 | 2.9 |
| Lutensol XL 80 | 1.1 | 1.1 | 1.1 | 1.1 |
| Emulsogen COL 100 | 2 | 2 | 2 | 2 |
| BDG (butyldiglycol) | 1 | 1 | 1 | 1 |
| $H_2O$ | 3 | 3 | 3 | 3 |

The abbreviations are defined as follows:
Nynas T 22 = mineral oil, obtainable from Nynas Naphthenics AB
Synative ™ ES EHO (Edenor EHO) = ethylhexyl oleate, obtainable from Cognis GmbH
Additin ® RC 4810 = sulphonic ester, obtainable from Rhein Chemie Rheinau GmbH
MEA = monoethanolamine, obtainable from Firma BASF AG
TEA = triethanolamine, obtainable from BASF AG
Rewocoros AC 101 = solution of a modified fatty acid alkylolamide, obtainable from Evonik Industries AG
TOFA = tall oil distillate, obtainable from Gustav Heess GmbH
Additin ® RC 5800 = 50% sodium solution of tolyltriazole sodium salt, obtainable from Rhein Chemie Rheinau GmbH
Additin ® RC 2415 = sulphurised fatty acid ester, obtainable from Rhein Chemie Rheinau GmbH
Additin ® RC 2317 = sulphurised fatty acid ester, obtainable from Rhein Chemie Rheinau GmbH
Emulsogen M = polyglycol ether with 5 mol of EO (ethylene oxide) based on oleyl alcohol/cetyl alcohol, obtainable from Clariant
Lutensol XL 80 = $C_{10}$-Guerbet alcohol etholylate with 8 mol of EO, obtainable from BASF AG
Emulsogen COL 100 = ether carboxylic acid with 10 mol of ethylene oxide (EO), obtainable from Clariant
BDG = butyldiglycol, obtainable from BASF AG
Cublen K 60 = 1-hydroxyethane-1,1-diphosphonic acid, obtainable from Zschimmer & Schwarz
TEOS = tetraethyl silicate c) Anticorrosion Tests with Aluminium Sheets in Emulsions 5% of the formulation prepared under b) are emulsified in water while stirring.

To assess the anticorrosive action, the following aluminium sheets 1 to 3

1. alloy 6016
2. alloy 7075 and
3. alloy 5754 are placed into an emulsion prepared from formulations A to D and visually assessed with regard to corrosion thereof after storage in this emulsion at room temperature for 3 days.

The results are compiled in the table which follows.

| Aluminium sheet No./emulsion from | 5% emulsion of formulation A (inventive) | 5% emulsion of formulation B (comparative) | 5% emulsion of formulation C (comparative) | 5% emulsion of formulation D (comparative) |
|---|---|---|---|---|
| 1 | no discolouration | black coloured | no discolouration | slight discolouration |
| 2 | no discolouration | black coloured | no discolouration | slight discolouration |
| 3 | no discolouration | distinct discolouration | no discolouration | slight discolouration |

| Aluminium sheet No./ emulsion from | 5% emulsion of formulation A (inventive) | 5% emulsion of formulation B (comparative) | 5% emulsion of formulation C (comparative) | 5% emulsion of formulation D (comparative) |
|---|---|---|---|---|
| pH of the emulsion | 9.3 | 9.3 | 9.3 | 9.3 |

Examples A demonstrate that the emulsions prepared from the inventive anticorrosion additives have significant anticorrosive effect.

The inventive mixtures are comparable to the silicon- or phosphorus-containing emulsions used in the prior art, and additionally have the advantage that no adverse effects occur in downstream processing operations, such as electrocoating and other coating methods, and the inventive anticorrosion additives for the manufacturing process are readily available.

What is claimed is:

1. An anticorrosion additive for aluminum and/or aluminum alloys in manufacturing processes, comprising:
    at least one triazole and
    the reaction product of at least one alkylene glycol and at least one carboxylic anhydride, wherein the at least one alkylene glycol comprises triethylene glycol and the at least one carboxylic anhydride comprises maleic anhydride, wherein the ratio by weight of the at least one alkylene glycol to the at least one carboxylic anhydride is 0.7:2 to 1.3:2.

2. The anticorrosion additive according to claim 1, wherein the at least one alkylene glycol further comprises a $C_3$-$C_{24}$-alkylene glycol.

3. The anticorrosion additive for aluminum and/or aluminum alloys in manufacturing processes according to claim 1, wherein the at least one carboxylic anhydride further comprises a cyclic, saturated, unsaturated and/or aromatic, optionally substituted, $C_4$-$C_{20}$-carboxylic anhydrides.

4. The anticorrosion additive for aluminum and/or aluminum alloys in manufacturing processes according to claim 1, wherein the at least one carboxylic anhydride further comprises phthalic anhydride, succinic anhydride, glutaric anhydride or mixtures thereof.

5. The anticorrosion additive for aluminium and/or aluminium alloys in manufacturing processes according to claim 1, wherein the at least one triazole is tolyltriazole, benzotriazole, or a mixture thereof.

6. The anticorrosion additive for aluminum and/or aluminum alloys in manufacturing processes according to claim 1, wherein the ratio by weight of the at least one triazole to the reaction product of the at least one alkylene glycol and the at least one carboxylic anhydride is 1:10 to 1:2.

7. A process for preparing the anticorrosion additive for manufacturing processes according to claim 1, comprising:
    preparing the reaction product of the at least one alkylene glycol and the at least one carboxylic anhydride by either
    a) melting the at least one carboxylic anhydride and then adding the at least one alkylene glycol at temperatures of at least 60° C., or
    b) reacting the at least one carboxylic anhydride and the at least one alkylene glycol at temperatures of at least 60° C., and
    then adding to the reaction product the at least one triazole.

8. A process for protecting aluminium and/or aluminium alloys from corrosion, comprising:
    applying the anticorrosion additive according to claim 1 to the aluminium and/or aluminium alloys.

* * * * *